United States Patent
Hagendorf et al.

(10) Patent No.: US 8,208,004 B2
(45) Date of Patent: Jun. 26, 2012

(54) DEVICE, METHODS, AND MEDIA FOR PROVIDING MULTI-POINT VIDEO CONFERENCING UNIT FUNCTIONS

(75) Inventors: Pierre Hagendorf, Raanana (IL); Yair Wiener, Herzlia (IL); Eli Doron, Ganey Tikva (IL)

(73) Assignee: Radvision Ltd., Tel Aviv (IL)

( * ) Notice: Subject to any disclaimer, the term of this patent is extended or adjusted under 35 U.S.C. 154(b) by 1358 days.

(21) Appl. No.: 11/801,085

(22) Filed: May 8, 2007

(65) Prior Publication Data
US 2008/0282165 A1   Nov. 13, 2008

(51) Int. Cl.
*H04N 7/14* (2006.01)

(52) U.S. Cl. .................................. 348/14.09; 348/14.08

(58) Field of Classification Search .............. 348/14.01, 348/14.08–9, 15; 379/88.13, 202.01
See application file for complete search history.

(56) References Cited

U.S. PATENT DOCUMENTS

| | | | |
|---|---|---|---|
| 5,473,363 A | 12/1995 | Ng et al. | |
| 5,710,591 A * | 1/1998 | Bruno et al. | 348/14.09 |
| 5,943,321 A | 8/1999 | St-Hilaire et al. | |
| 5,963,547 A * | 10/1999 | O'Neil et al. | 348/14.09 |
| 6,346,963 B1 * | 2/2002 | Katsumi | 348/14.09 |
| 6,356,294 B1 | 3/2002 | Martin et al. | |
| 6,438,111 B1 | 8/2002 | Catanzaro et al. | |
| 6,611,822 B1 | 8/2003 | Beams et al. | |
| 6,625,258 B1 * | 9/2003 | Ram et al. | 379/88.13 |
| 7,047,279 B1 | 5/2006 | Beams et al. | |
| 7,152,092 B2 | 12/2006 | Beams et al. | |
| 7,174,365 B1 | 2/2007 | Even et al. | |
| 2005/0018039 A1 * | 1/2005 | Lucioni | 348/14.01 |

OTHER PUBLICATIONS

Radvision Ltd., Scopia100 MCU User Guide Version 5.1, Dec. 2006, pp. 1-189.

* cited by examiner

*Primary Examiner* — Suhan Ni
(74) *Attorney, Agent, or Firm* — Byrne Poh LLP (57) ABSTRACT

Devices, methods, and media for providing multi-point video conferencing unit functions are provided. In some embodiments, devices for providing multi-point conferencing unit functions comprise: a combination of at least one input interface that receives a plurality of video signals, and that receives a visual layout from an EMCU end-point; a processor that selects a subset of the plurality of video signals; a combination of at least one output interface that sends the subset of the plurality of video signals to the EMCU end-point and that sends the visual layout to a video conferencing end-point, wherein the visual layout incorporates the subset of the plurality of video signals.

33 Claims, 4 Drawing Sheets

DEVICE, METHODS, AND MEDIA FOR PROVIDING MULTI-POINT VIDEO CONFERENCING UNIT FUNCTIONS

TECHNICAL FIELD

The disclosed subject matter relates to devices, methods, and media for providing multi-point video conferencing unit functions.

BACKGROUND

A video conferencing end-point that is equipped with an Embedded Multi-point Conferencing Unit (EMCU), referred to as an EMCU end-point, is capable of providing a multi-point video conference for several video conferencing end-points. Organizations that deploy small video conferencing networks tend to choose an EMCU end-point because of the relatively low cost involved and the simplicity of its deployment. For example, one or more EMCU end-points can be quickly purchased (e.g., without an extensive budget) and readily deployed at the early stages of building a video conferencing network.

As the video conferencing network grows, however, the EMCU end-points cannot provide the scalability and capacity that are required for deploying medium and/or large scale video conferencing networks. For example, an EMCU end-point can be limited in the number of video conferencing end-points that the EMCU end-point can support in a video conference. The number of video stream layouts and the number of different bit-rates that the EMCU end-point can support can also be limited.

Several solutions have been proposed in the past to address such shortcomings. For example, a network-based multi-point conferencing system that can include existing EMCU end-points has been proposed. Such conferencing systems, however, can be much more costly. Moreover, such proposed systems have under utilized the capacity of the existing EMCU end-points. For example, previously proposed conferencing systems have not fully utilized the functionalities that the existing EMCU end-points are designed to perform, such as video processing, thereby relegating the existing EMCU end-points to the limited role of video conferencing end-points.

SUMMARY

Devices, methods, and media for providing multi-point video conferencing unit functions are provided. In some embodiments, devices for providing multi-point conferencing unit functions comprise: a combination of at least one input interface that receives a plurality of video signals, and that receives a visual layout from an EMCU end-point; a processor that selects a subset of the plurality of video signals; a combination of at least one output interface that sends the subset of the plurality of video signals to the EMCU end-point and that sends the visual layout to a video conferencing end-point, wherein the visual layout incorporates the subset of the plurality of video signals.

In some embodiments, devices for providing multi-point conferencing unit functions, comprise: a combination of at least one input interface that receive a plurality of audio signals, and that receives an isolated EMCU end-point user audio signal from an EMCU end-point; a processor that selects a subset of the plurality of audio signals and mixes the subset of the plurality of audio signals to produce a mixed audio signal; and a combination of at least one output interface that sends the mixed audio signal to the EMCU end-point.

In some embodiments, methods for providing multi-point video conferencing unit functions are provided. These methods comprise: receiving a plurality of video signals; receives a visual layout from an EMCU end-point; selecting a subset of the plurality of video signals; sending the subset of the plurality of video signals to the EMCU end-point; and sending the visual layout to a video conferencing end-point, wherein the visual layout incorporates the subset of the plurality of video signals.

In some embodiments, methods for providing multi-point video conferencing unit functions are provided. These methods comprise: receiving a plurality of audio signals; receiving an isolated EMCU end-point user audio signal from an EMCU end-point; selecting a subset of the plurality of audio signals; mixing the subset of the plurality of audio signals to produce a mixed audio signal; and sending the mixed audio signal to the EMCU end-point.

In some embodiments, computer-readable medium containing computer-executable instructions that, when executed by a processor, cause the processor to perform a method for providing multi-point video conferencing unit functions are provided. The method comprises: receiving a plurality of video signals; receives a visual layout from an EMCU end-point; selecting a subset of the plurality of video signals; sending the subset of the plurality of video signals to the EMCU end-point; and sending the visual layout to a video conferencing end-point, wherein the visual layout incorporates the subset of the plurality of video signals.

In some embodiments, computer-readable medium containing computer-executable instructions that, when executed by a processor, cause the processor to perform a method for providing multi-point video conferencing unit functions are provided. The method comprises: receiving a plurality of audio signals; receiving an isolated EMCU end-point user audio signal from an EMCU end-point; selecting a subset of the plurality of audio signals; mixing the subset of the plurality of audio signals to produce a mixed audio signal; and sending the mixed audio signal to the EMCU end-point.

DETAILED DESCRIPTION

Devices, methods, and media for providing multi-point video conferencing unit functions are provided. In some embodiments of the disclosed subject matter, devices, methods, and media are provided for providing multi-point video conferencing unit functions by leveraging the processing capacity of one or more EMCU end-points. A network MCU can be used to connect the EMCU end-point(s). For example, each of the EMCU end-points can communicate with video conferencing end-points and/or with other EMCU end-points through the network MCU. The network MCU can provide switching services for video streams from the video conferencing end-points and the EMCU end-points, and can process and provide switching services for audio streams from the video conferencing end-points. The EMCU end-points can process video streams and generate visual layouts for the video conferencing end-points, and provide these visual layouts to the network MCU for distribution to other end-points.

Figure 1:
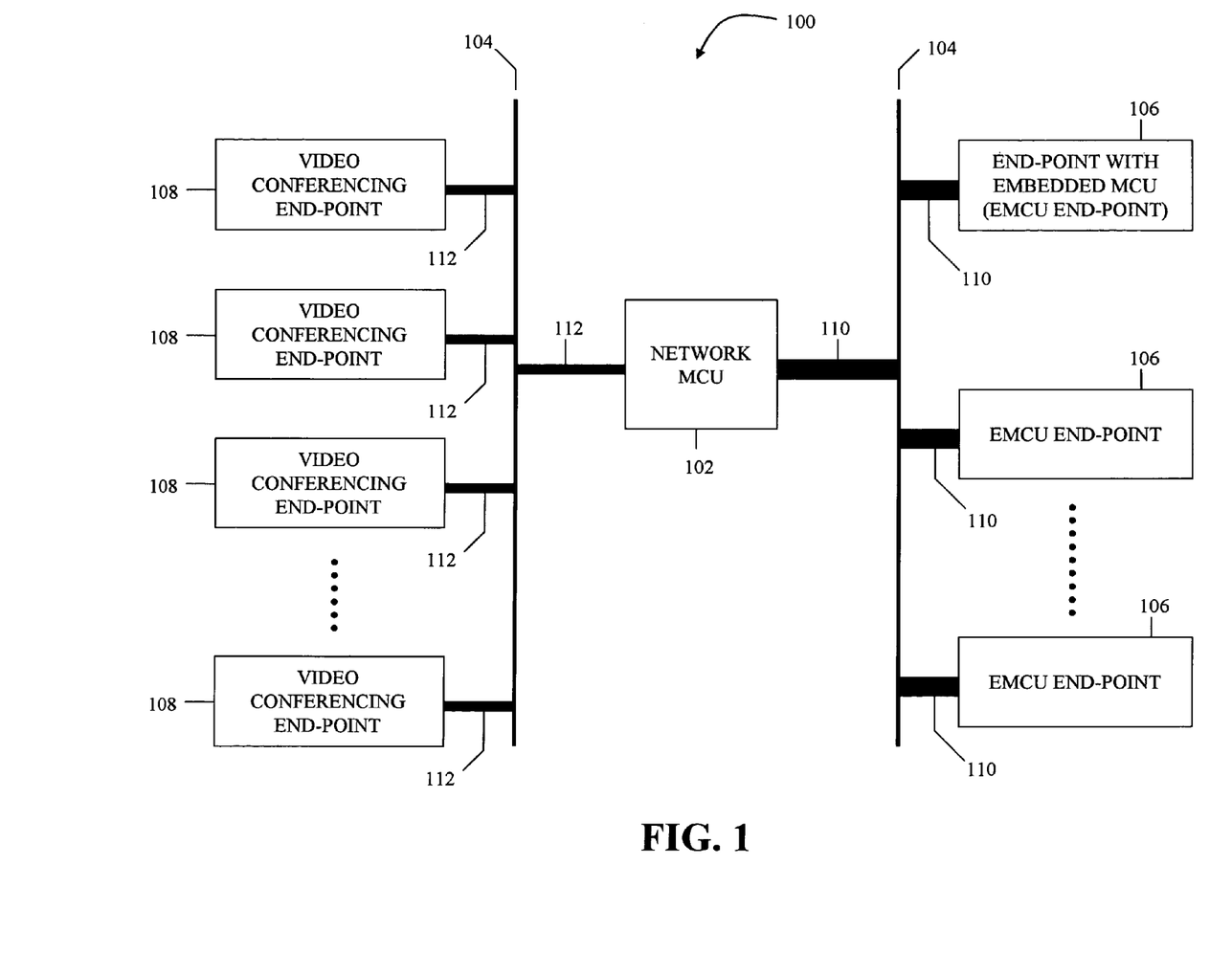
FIG. 1 is a schematic diagram of a system for providing multi-point video conferencing using a network MCU and one or more EMCU end-points in accordance with some embodiments of the disclosed subject matter.
Figure 2:
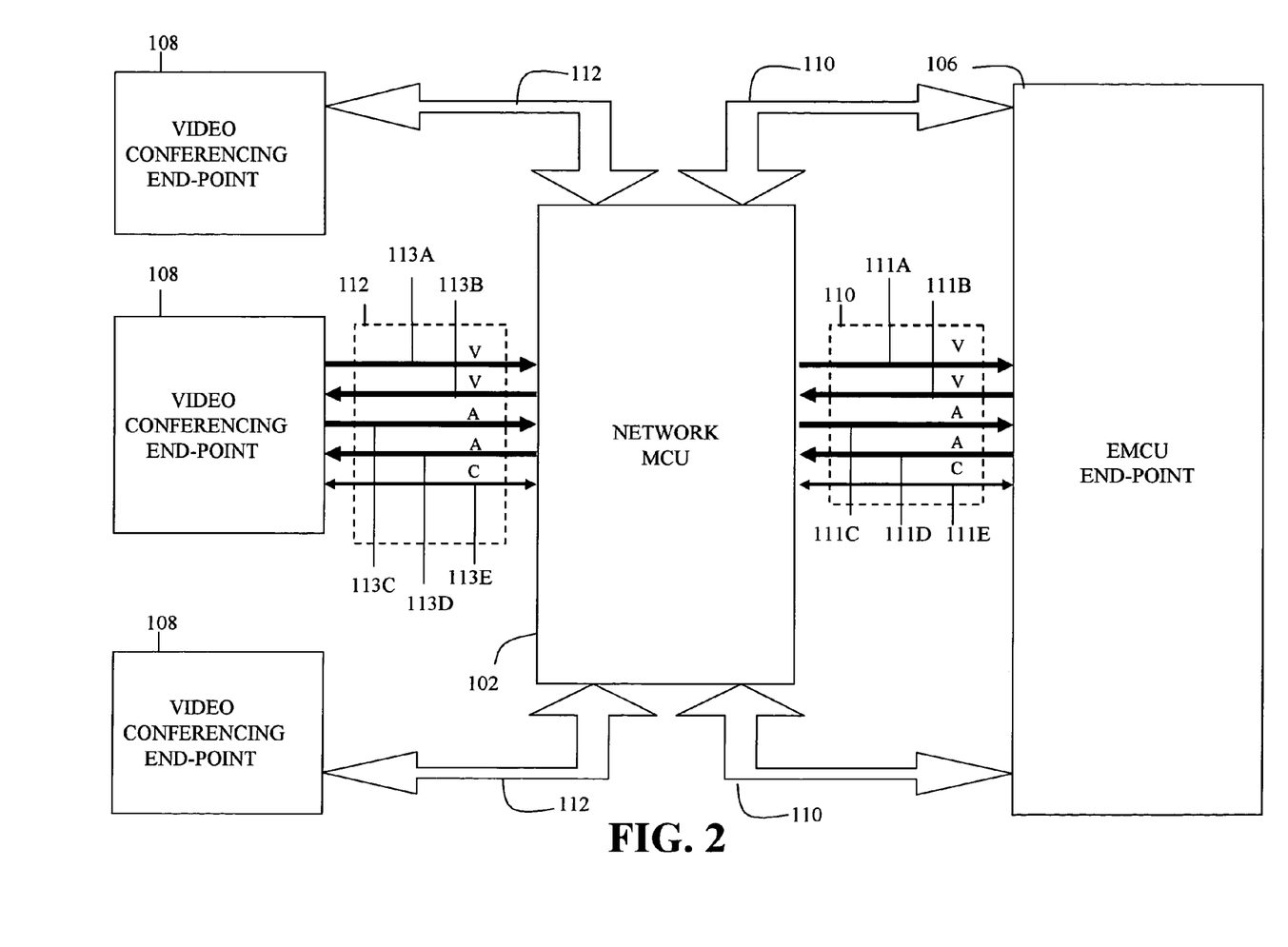
FIG. 2 is an illustration of a set of communication channels between a network MCU and an EMCU end-point and a set of communication channels between the network MCU and a video conferencing end-point in accordance with some embodiments of the disclosed subject matter.

FIGS. 1 and 2 are referenced together to illustrate a system 100 for providing multi-point video conferencing.

FIG. 1 is a schematic diagram of system 100 for providing multi-point video conferencing using a network MCU and one or more EMCU end-points in accordance with some embodiments. As illustrated, system 100 includes a network MCU 102, a network 104, one or more EMCU end-points 106, one or more video conferencing end-points 108, a set of EMCU end-point calls 110, and a set of video conferencing end-point calls 112.

Network MCU 102 can be a program, such as an instance of application software, a library function and/or procedure, one or more background daemon processes, one or more instances of an executable thread, and/or various other suitable pieces of software. Network MCU 102 can also be a device containing one or more processors, such as a general-purpose computer, a special-purpose computer, a digital processing device, a server, and/or various other suitable devices, that can run such a program.

Network 104 can be a local area network (LAN), a wide area network (WAN), a wireless network, a cable network, a telephone network, the Internet, and/or various other suitable networks in which a multi-point video conferencing system can be implemented.

EMCU end-point 106 can be a video conferencing end-point equipped with an EMCU. For example, some such EMCU end-points are manufactured by video conferencing end-point manufacturers, such as POLYCOM®, TANDBERG®, SONY®, LIFESIZE®, AETHRA®, and/or various other suitable manufacturers. In some embodiments, as for network MCU 102, EMCU end-point 106 can be a program or a device running a program.

Video conferencing end-point 108 can be any suitable device for providing a video conferencing end-point. For example, it can be a dedicated end-point device, a personal computer running suitable software, a telephone, a mobile phone, a personal data assistant, an email device, and/or various other suitable devices that can be used to participate in a video conference. In some embodiments, the functionalities that are necessary to participate in a video conference are built into video conferencing end-point 108. In some embodiments, video conferencing end-point 108 can add some of the functionalities by interfacing with peripheral devices capable of providing such functionalities. For example, some such video conferencing end-points are manufactured by video conferencing manufacturers, such as POLYCOM®, TANDBERG®, SONY®, LIFESIZE®, AETHRA®, and/or various other suitable manufacturers.

FIG. 2 is an illustration of a set of calls 110 between network MCU 102 and EMCU end-point 106 and a set of calls 112 between network MCU 102 and video conferencing end-point 108 in accordance with some embodiments. Calls 110 and 112 can be any logical connection between network MCU 102 and a respective one of EMCU end-point 106 and video conferencing end-point 108. For example, calls 110 and 112 can be implemented with dial-up telephone calls, with TCP/IP connections (e.g., via the Internet for example), etc.

EMCU end-point calls 110 can include video channels 111A and 111B, audio channels 111C and 111D and a control channel 111E. Video channels 111A and 111B can include one or more outgoing video channels 111A to EMCU end-point 106 and one or more incoming video channels 111B from EMCU end-point 106.

Similarly, audio channels 111C and 111D can include one or more outgoing audio channels 111C to EMCU end-point 106 and one or more incoming audio channels 111D from EMCU end-point 106.

Control channel 111E can be used to send and receive control commands between network MCU 102 and EMCU end-points 106.

Video conferencing end-point calls 112 can include video channels 113A and 113B, audio channels 113C and 113D, and a control channel 113E that connect network MCU 102 and video conferencing end-point 108. Video channels 113A and 113B can include one or more outgoing video channels 113B to video conferencing end-point 108 and one or more incoming video channels 113A from video conferencing end-point 108.

Similarly, audio channels 113C and 113D can include one or more outgoing audio channels 113D to video conferencing end-point 108 and one or more incoming audio channels 113C from video conferencing end-point 108.

Control channel 113E can be used to send and receive control commands between network MCU 102 and end-points 108.

Calls 110 and 112 can also include presence information channels, data channels, far-end cameral control channels, and various other standard and/or proprietary channels.

Although three calls 110 are shown between network MCU 102 and EMCU end-point 106 in FIG. 2, any suitable number of calls can be used. Similarly, although three call 112 are shown, any number of calls 112 can be used.

FIGS. 2, 3A-B, and 4A-B are referenced together to illustrate a method 300 for providing multi-point video conferencing.

Figure 3A:
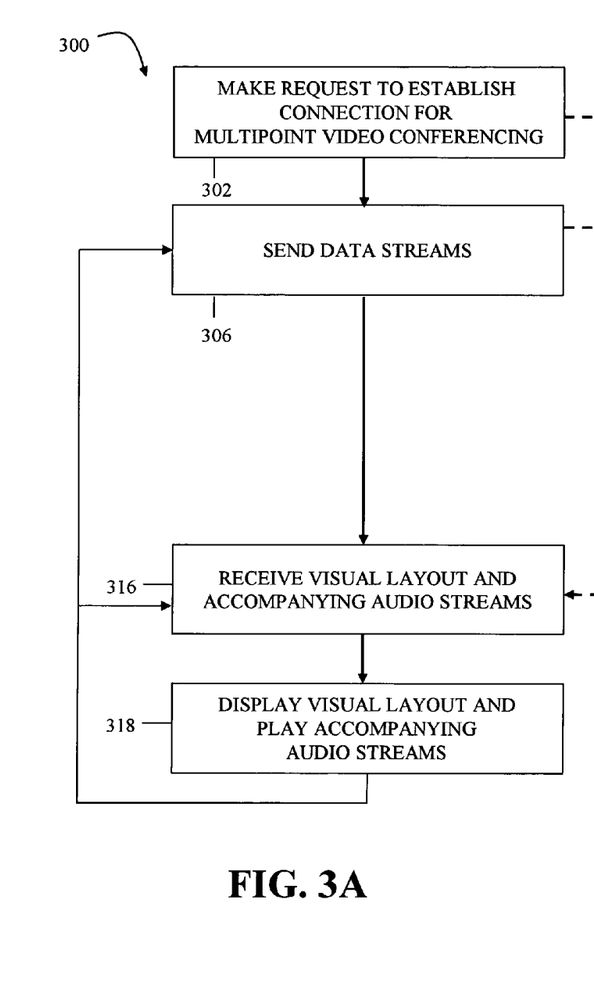
FIGS. 3A-B illustrate a method for providing multi-point video conferencing in accordance with some embodiments of the disclosed subject matter.
Figure 3B:
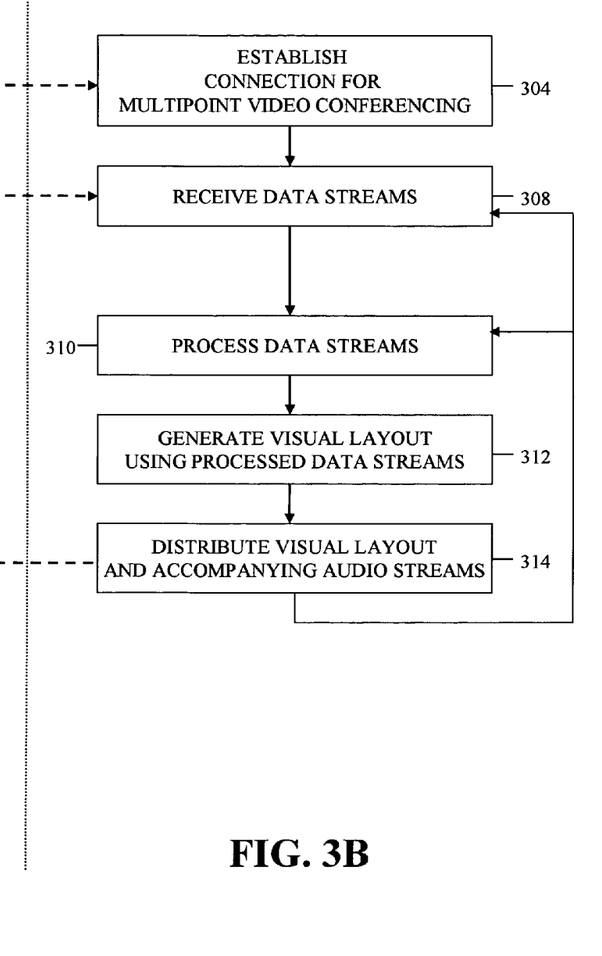

FIGS. 3A-B illustrate a method 300 for providing multi-point video conferencing in accordance with some embodiments. FIG. 3A illustrates a set of representative functionalities that can be performed by EMCU end-point 106 and video conferencing end-point 108 in accordance with some embodiments. FIG. 3B illustrates a set of representative functionalities that can be performed by network MCU 102 and EMCU end-point 106 in accordance with some embodiments.

As shown, at 302, a request to establish a connection for a multi-point video conference is made. A user can make such request using video conferencing end-point 108 or EMCU end-point 106.

At 304, one or more connections are established for the requested multi-point video conference. In some embodiments, network MCU 102 establishes the connections. In some embodiments, the connections include EMCU end-point calls 110 and video conferencing end-point calls 112. In some embodiments, the calls can be established and/or terminated dynamically at any time during a multi-point video conference.

At 306, data streams are sent through the connections established via the calls. The data streams can include video streams, audio streams, steams showing a whiteboard, and/or various other suitable types of data streams. For example, video streams can be generated and sent once a user begins participating in the video conference using video conferencing end-point 108 or EMCU end-point 106, and may include frames of video. Audio steams can be generated and sent when the user begins speaking.

At 308, the data streams are received. In some embodiments, for example, network MCU 102 initially receives the data streams from video conferencing end-points 108 through channels 113A and 113C.

In some embodiments, network MCU 102 may send flow control commands to end-points 108 and/or EMCU end-points 106 to control the data streams. For example, network MCU 102 may instruct end-points 108 and 106 to reduce the video bandwidth to 512 kbps, or any other suitable data rate.

At 310, the data streams received at 308 are processed. Processing data streams can include encoding, decoding, mixing, selecting, switching, and various other suitable operations. In some embodiments, network MCU 102 processes the received data streams. In some embodiments, EMCU end-points 106 process the data streams. In some embodiments, network MCU 102 and EMCU end-points 106 can share the data stream processing tasks. For example, network MCU 102 can decode, mix, select, and/or switch audio streams and select and switch video streams and EMCU end-point 106 can decode, encode, and/or mix video streams. As another example, in some embodiments, network MCU 102 can also decode, encode, and/or mix video streams.

The selection of audio streams can be made based on one or more factors. In some embodiments, for example, the selection is made by the network MCU 102 based on which user is currently speaking the most loudly and only that user is included in the conference audio. In some embodiments, for example, multiple users that are speaking the most loudly are included in the conference audio. In some embodiments, users that are selected for a conference video are also selected for a conference audio. In some embodiments, the audio streams can be selected based on user input. Any other suitable criteria or criterion can be user to select audio.

After being selected, the audio may be mixed by network MCU 102 and distributed to end-points 108 and 106. The audio provided to each end-point 108 may be a mixture of the audio from one or more of the users presented in the visual layout without the audio of the user(s) at that end-point.

The selection of video streams can be made based on one or more factors. In some embodiments, for example, the selection is made based on which users have spoken most recently. In some embodiments, the selection can be based on the order in which each user has joined the video conference. In some embodiments, the selection is, in part, made based on what type of end-point device each user is using. For instance, a user may always be a part of a visual layout because the user is participating in the video conference using the EMCU end-point that generates the visual layout. In some embodiments, the selection may be made so that video of whichever user is speaking is always provided to a certain EMCU end point 108 that is creating a visual layout. In some embodiments, the selection of video streams can be based on user input. Any other suitable criteria or criterion can be used to select video.

Figure 4A:
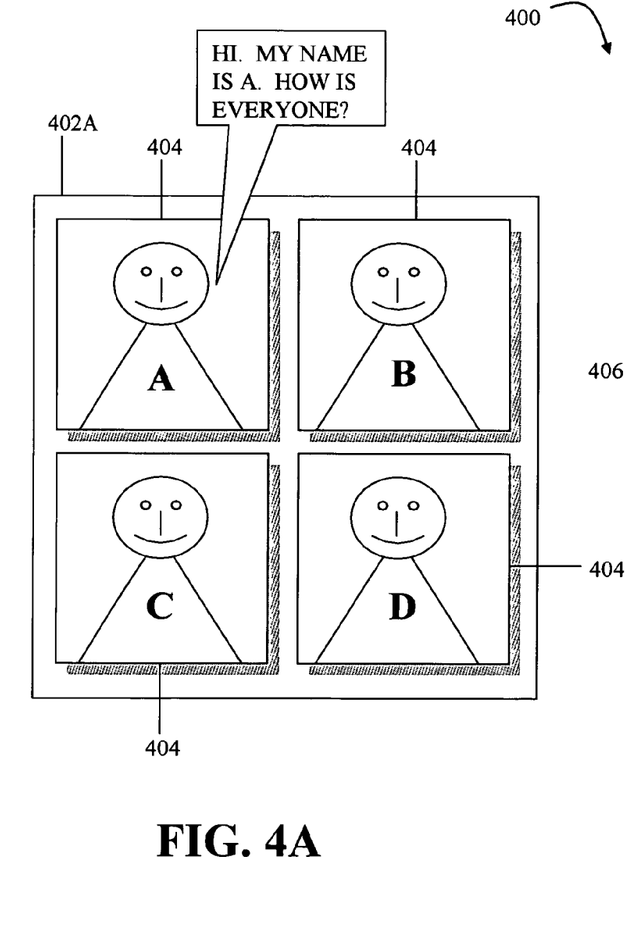
FIGS. 4A-B are illustrations of visual layouts that are displayed on the screens of EMCU end-points and/or video conferencing end-points in accordance with some embodiments of the disclosed subject matter.
Figure 4B:
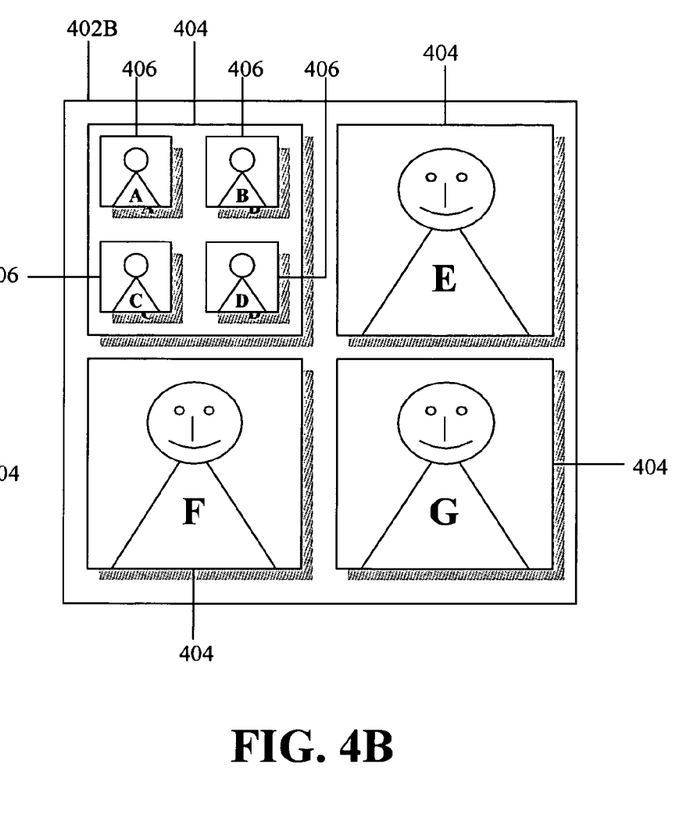

At 312, visual layouts may be generated using the data stream that is processed at 310. Examples of visual layouts are shown in FIGS. 4A and 4B. In some embodiments, network MCU 102 is connected to one EMCU end-point 106 and a visual layout 402A is generated by that EMCU end-point. When multiple EMCU end-points 106 are connected to network MCU 102, each may generate a visual layout which may be the same or different from visual layouts generated by other EMCU end-points 106. In some embodiments, a new visual layout can be generated for each frame of a video stream.

In some embodiments, a user that participates in a video conference using an EMCU end-point 106 can, or network MCU 102 can, customize the visual layout that that user sees. For example, that user can select to see only other, specified users. In such a case, a command may be sent to the network MCU instructing it to provide the corresponding video signals to the EMCU end-point. This command may be sent using any suitable mechanism, such as an interface from the EMCU to the network MCU, an interface on a Web page (for example) hosted in connection with the network MCU, a DTMF command entered by the user and received by the network MCU, a voice command entered by the user and recognized by the network MCU, etc. The EMCU end-point 106 with the customized visual layout may then send to network MCU 102, as its output video, the video being presented on its display and/or the video of the user(s) at that EMCU end-point.

At 314, the visual layout generated at 312 is distributed along with any audio stream(s) selected and mixed at 310. For example, network MCU 102 can receive the visual layout through incoming video channel 111B and distribute the visual layout and audio to users A and D-G or users A, C-D, and F-G, respectively, through outgoing video and audio channels 113B and 113D.

In some embodiments, users at end-points 108 can select to see any visual layout or user video (e.g., a video generated by an end-point 108 or 106 for the user(s) at that end-point) that is received by network MCU 102. In such cases, the users may send from their end-points 108 suitable control signals (e.g., using an interface between end-point 108 and network MCU 102, using a Web page, using a DTMF command, using a voice command, etc.) to cause network MCU 102 to send the appropriate visual layout or user video.

At 316, the visual layout generated at 312 is received along with the accompanying audio streams. In some embodiments, for example, video conferencing end-points 108 can receive the visual layout and the accompanying audio streams through channels 113B and 113D. At 318, the visual layout is displayed and the accompanying audio streams are played.

As should be apparent, 310-318 may subsequently be repeated for each portion, e.g., a frame, of a stream, and 306-318 repeated for subsequent streams.

FIGS. 4A-B are referenced to illustrate 312-318. FIGS. 4A-B are illustrations of visual layouts 400, such as 402A and 402B, that can be displayed on the screen of EMCU end-points 106 and/or video conferencing end-points 108 in accordance with some embodiments. Visual layouts 400 can include one or more independent display areas 404 and 406.

To aid in understanding these layouts, suppose, for example, that network MCU 102 has received seven video streams and seven audio streams from seven different users A-G who are in a video conference. Suppose also that user B participates in the video conference using EMCU end-point 106 and users A and C-G participate in the video conference using video conferencing end-points 108. Initially, user A is speaking while the rest of the users are listening to user A.

Network MCU 102 can receive video streams sent by users A and C-G on video channels 113A of corresponding calls 112. Network MCU 102 can then select one or more video streams and direct the selected video streams to EMCU end-point 106. For example, network MCU 102 can select three video streams of users A, C, and D, as illustrated in FIG. 4A, and direct the video streams to EMCU end-point 106 through the outgoing video channels 111A for three respective calls 110. EMCU end-point 106 can then decode the video streams, mix the selected video streams and the video stream generated by user B, generate visual layout 402A, and send visual layout 402A back to network MCU 102 through the incoming video channel 111B for one or more of the calls 110. Network MCU 102 can then distribute visual layout 402A to video conferencing end-points 108 through outgoing video channels 113B of corresponding calls 112.

Network MCU 102 can also select and mix audio streams from one or more users and send the mixed audio to end-points 106 and 108 for presentation to the users. For example, if a user at an end-point 108 (e.g., user A) is determined to be talking, and the network MCU is configured to only present the voice of the speaking user, then the audio of that user can be selected, optionally mixed, and distributed to each of the end-points 106 and 108.

The audio streams provided to an EMCU end-point 106 can be provided in various different ways. For example, the audio from each of users A, C, and D can be selected and mixed together. The mixed audio can then be sent to EMCU end-point 106 through an outgoing audio channel 111C of one call 110. Alternatively, the audio for users A, C, and D can be sent to EMCU end-point 106 so that some of the audio streams (e.g., that of users A and C) are mixed together and sent on an outgoing audio channel 111C of one call 110 and one or more audio streams (e.g., that of user D) are each kept separate and sent to EMCU end-point 106 on their own channel 111C of a call 110. As yet another alternative, each of the audio streams can be sent separately from the other audio streams on their own audio outgoing audio channel 111C of a call 110. In some embodiments, when two or more of the audio streams are mixed together and sent on a single audio channel, some of the audio channels 111C to EMCU end-point 106 may be unnecessary and therefore omitted, established with a no signal, or established with a muted or heavily attenuated signal.

Suitable processing may be required in network MCU to isolate the audio of the user at an EMCU end-point. For example, in some embodiments, when all of the audio streams being provided to the EMCU end-point (e.g., that of users A, C, and D) are mixed together and sent on a single audio channel 111C, the EMCU end-point will provide back to the network MCU the audio of the user at the EMCU end-point (e.g., user B) on the incoming audio channel 111D on the same call 110 as the single audio channel 111C. In this example, the processing is performed by mixing the audio streams of users A, C, and D before those streams are sent to the EMCU end-point. As another example, if the EMCU end-point provides back to network MCU audio of its user (e.g., user B) that is mixed with one or more other users (e.g., user D), the network MCU may need to subtract out the audio of those other users to obtain the audio of user B. Once the audio of a user at an EMCU end-point has been isolated, the audio can then be selected and mixed by network MCU 102 in a similar fashion to the audio of any end-point 108.

In some embodiments, network MCU 102 is connected to more than one EMCU end-point 106. Suppose, for example, that users B and E participate in the video conference using different EMCU end-points 106. In some embodiments, network MCU 102 can receive visual layout 402A from user B's EMCU end-point 106 and feed it to one of its outgoing video channels to user E's EMCU end-point 106 along with two other video streams that network MCU 102 has selected (e.g., as illustrated, video streams of users F and G). User E's EMCU end-point 106 can then generate a different visual layout 402B, as illustrated in FIG. 4B, using visual layout 402A and the two other video streams of, for instance, users F and G. Network MCU 102 can then distribute visual layout 402B to all or some of the users A, C-D, and F-G.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A conferencing device for providing multi-point conferencing unit functions, comprising:
at least one input interface that receives a plurality of video signals from a plurality of video conferencing end-points, wherein at least one of the plurality of video conferencing end-points is an embedded multi-point conferencing unit (EMCU) end-point equipped with an EMCU that has processing capabilities, and that receives a visual layout from the EMCU end-point;
a processor that selects a subset of the plurality of video signals received from the plurality of video conferencing end-points and processes a first portion of the subset of the plurality of video signals for incorporation into the visual layout; and
at least one output interface that sends the subset of the plurality of video signals to the EMCU end-point for using the processing capabilities to process a second portion of the subset of the plurality of video signals for incorporation into the visual layout and that sends the visual layout with the subset of the plurality of video signals processed by the conferencing device and the EMCU end-point to the plurality of video conferencing endpoints.

2. The device of claim 1, wherein: the combination of at least one input interface also receives a plurality of audio signals, and receives an isolated EMCU end-point user audio signal from the EMCU end-point; the processor also selects a subset of the plurality of audio signals and mixes the subset of the plurality of audio signals to produce a mixed audio signal; and the combination of at least one output interface also sends the mixed audio signal to the EMCU end-point.

3. The device of claim 2, wherein the combination of at least one output interface also sends a muted audio signal to the EMCU end-point.

4. The device of claim 2, wherein the combination of at least one output interface has an audio channel with the EMCU end-point that has no audio signal.

5. The device of claim 2, wherein the only audio signal provided to the EMCU end-point is the mixed audio signal.

6. The device of claim 1, wherein one of the plurality of video signals is a second visual layout received from a second EMCU end-point, and wherein the processor selects the second visual layout as part of the subset of the plurality of video signals.

7. The device of claim 1, wherein all of the plurality of video signals are received from video conferencing end-points.

8. A conferencing device for providing multi-point conferencing unit functions, comprising:
at least one input interface that receives a plurality of audio signals from a plurality of video conferencing end-points, wherein at least one of the plurality of video conferencing end-points is an embedded multi-point conferencing unit (EMCU) end-point equipped with an EMCU that has processing capabilities, and that receives an isolated EMCU end-point user audio signal from the EMCU end-point;

a processor that selects a subset of the plurality of audio signals received from the plurality of video conferencing end-points and processes a first portion of the subset of the plurality audio signals for incorporation into the isolated EMCU end-point user audio signal; and at least one output interface that sends the isolated EMCU end-point user audio signal to the EMCU end-point for using the processing capabilities to process a second portion of the subset of the plurality of audio signals for incorporation into the isolated EMCU end-point user audio signal and that sends the isolated EMCU end-point user audio signal with the subset of the plurality of audio signals processed by the conferencing device and the EMCU end-point to the plurality of video conferencing endpoints.

9. The device of claim 8, wherein the combination of at least one output interface also sends a muted audio signal to the EMCU end-point.

10. The device of claim 8, wherein the combination of at least one output interface has an audio channel with the EMCU end-point that has no audio signal.

11. The device of claim 8, wherein the only audio signal provided to the EMCU end-point is the mixed audio signal.

12. A method for providing multi-point conferencing unit functions, comprising:
using a conferencing device to establish connections between a plurality of video conferencing end-points, wherein at least one of the plurality of video conferencing end-points is an embedded multi-point conferencing unit (EMCU) end-point equipped with an EMCU that has processing capabilities;
receiving, using the conferencing device, a plurality of video signals from the plurality of video conferencing end-points;
receiving, using the conferencing device, a visual layout from the EMCU end-point;
selecting, using the conferencing device, a subset of the plurality of video signals;
processing, using the conferencing device, a first portion of the subset of the plurality of video signals for incorporation into the visual layout;
sending, using the conferencing device, the subset of the plurality of video signals to the EMCU end-point for using the processing capabilities to process a second portion of the subset of the plurality of video signals for incorporation into the visual layout; and
sending, using the conferencing device, the visual layout with the subset of the plurality of video signals processed by the conferencing device and the EMCU end-point to the plurality of video conferencing end-points endpoint.

13. The method of claim 12, further comprising: receiving a plurality of audio signals; receiving an isolated EMCU end-point user audio signal from the EMCU end-point; selecting a subset of the plurality of audio signals; mixing the subset of the plurality of audio signals to produce a mixed audio signal; and sending the mixed audio signal to the EMCU end-point.

14. The method of claim 13, further comprising sending a muted audio signal to the EMCU end-point.

15. The method of claim 13, further comprising maintaining an audio channel with the EMCU end-point that has no audio signal.

16. The method of claim 13, wherein the only audio signal provided to the EMCU end-point is the mixed audio signal.

17. The method of claim 12, wherein one of the plurality of video signals is a second visual layout received from a second EMCU end-point, and the second visual layout is selected as part of the subset of the plurality of video signals.

18. The method of claim 12, wherein all of the plurality of video signals are received from video conferencing end-points.

19. A method for providing multi-point conferencing unit functions, comprising:
using a conferencing device to establish connections between a plurality of video conferencing end-points, wherein at least one of the plurality of video conferencing end-points is an embedded multi-point conferencing unit (EMCU) end-point equipped with an EMCU that has processing capabilities;
receiving, using the conferencing device, a plurality of audio signals from the plurality of video conferencing end-points;
receiving, using the conferencing device, an isolated EMCU end-point user audio signal from the EMCU end-point;
selecting, using the conferencing device, a subset of the plurality of audio signals;
processing, using the conferencing device, a first portion of the subset of the plurality of audio signals for incorporation into the isolated EMCU end-point user audio signal;
sending, using the conferencing device, the subset of the plurality of audio signals to the EMCU end-point for using the processing capabilities to process a second portion of the subset of the plurality of audio signals for incorporation into the isolated EMCU end-point user audio signal; and
sending, using the conferencing device, the isolated EMCU end-point user audio signal with the subset of the plurality of audio signals processed by the conferencing device and the EMCU end-point to the plurality of video conferencing end-points.

20. The method of claim 19, further comprising sending a muted audio signal to the EMCU end-point.

21. The method of claim 19, further comprising maintaining an audio channel with the EMCU end-point that has no audio signal.

22. The method of claim 19, wherein the only audio signal provided to the EMCU end-point is the mixed audio signal.

23. A non-transitory computer-readable medium containing computer-executable instructions that, when executed by a processor, cause the processor to perform a method for providing multi-point conferencing unit functions, the method comprising:
using a conferencing device to establish connections between a plurality of video conferencing end-points, wherein at least one of the plurality of video conferencing end-points is an embedded multi-point conferencing unit (EMCU) end-point equipped with an EMCU that has processing capabilities;
receiving, using the conferencing device, a plurality of video signals from the plurality of video conferencing end-points;
receiving, using the conferencing device, a visual layout from the EMCU end-point;
selecting, using the conferencing device, a subset of the plurality of video signals;

processing, using the conferencing device, a first portion of the subset of the plurality of video signals for incorporation into the visual layout;

sending, using the conferencing device, the subset of the plurality of video signals to the EMCU end-point for using the processing capabilities to process a second portion of the subset of the plurality of video signals for incorporation into the visual layout; and sending, using the conferencing device, the visual layout with the subset of the plurality of video signals processed by the conferencing device and the EMCU end-point to the plurality of video conferencing end-points.

24. The medium of claim 23, wherein the method further comprises: receiving a plurality of audio signals; receiving an isolated EMCU end-point user audio signal from the EMCU end-point; selecting a subset of the plurality of audio signals; mixing the subset of the plurality of audio signals to produce a mixed audio signal; and sending the mixed audio signal to the EMCU end-point.

25. The medium of claim 24, wherein the method further comprises sending a muted audio signal to the EMCU end-point.

26. The medium of claim 24, wherein the method further comprises maintaining an audio channel with the EMCU end-point that has no audio signal.

27. The medium of claim 24, wherein the only audio signal provided to the EMCU end-point is the mixed audio signal.

28. The medium of claim 23, wherein one of the plurality of video signals is a second visual layout received from a second EMCU end-point, and the second visual layout is selected as part of the subset of the plurality of video signals.

29. The medium of claim 23, wherein all of the plurality of video signals are received from video conferencing end-points.

30. A non-transitory computer-readable medium containing computer-executable instructions that, when executed by a processor, cause the processor to perform a method for providing multi-point conferencing unit functions, the method comprising:

using a conferencing device to establish connections between a plurality of video conferencing end-points, wherein at least one of the plurality of video conferencing end-points is an embedded multi-point conferencing unit (EMCU) end-point equipped with an EMCU that has processing capabilities;

receiving, using the conferencing device, a plurality of audio signals from the plurality of video conferencing end-points;

receiving, using the conferencing device, an isolated EMCU end-point user audio signal from the EMCU end-point;

selecting, using the conferencing device, a subset of the plurality of audio signals;

processing, using the conferencing device, a first portion of the subset of the plurality of audio signals for incorporation into the isolated EMCU end-point user audio signal;

sending, using the conferencing device, the subset of the plurality of audio signals to the EMCU end-point for using the processing capabilities to process a second portion of the subset of the plurality of audio signals for incorporation into the isolated EMCU end-point user audio signal; and sending, using the conferencing device, the isolated EMCU end-point user audio signal with the subset of the plurality of audio signals processed by the conferencing device and the EMCU end-point to the plurality of video conferencing end-points.

31. The medium of claim 30, wherein the method further comprises sending a muted audio signal to the EMCU end-point.

32. The medium of claim 30, wherein the method further comprises maintaining an audio channel with the EMCU end-point that has no audio signal.

33. The medium of claim 30, wherein the only audio signal provided to the EMCU end-point is the mixed audio signal.

* * * * *